United States Patent
Manlove et al.

(10) Patent No.: US 7,331,212 B2
(45) Date of Patent: Feb. 19, 2008

(54) SENSOR MODULE

(75) Inventors: Gregory J. Manlove, Kokomo, IN (US); Stephen P. Long, Tipton, IN (US); Hamid R. Borzabadi, Noblesville, IN (US); Timothy A. Vas, Kokomo, IN (US); Kevin J. Hawes, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 109 days.

(21) Appl. No.: 11/328,032

(22) Filed: Jan. 9, 2006

(65) Prior Publication Data

US 2007/0157699 A1  Jul. 12, 2007

(51) Int. Cl.
*G01N 3/30* (2006.01)
(52) U.S. Cl. .............. 73/12.01; 73/504.03; 73/504.04; 73/511; 73/778; 73/804; 73/805
(58) Field of Classification Search ............... 73/12.01, 73/504.03, 504.04, 511, 778, 804, 805, 862.26
See application file for complete search history.

(56) References Cited

U.S. PATENT DOCUMENTS

| | | | | |
|---|---|---|---|---|
| 5,345,823 A | * | 9/1994 | Reidemeister et al. | ... 73/514.32 |
| 6,145,380 A | * | 11/2000 | MacGugan | ............. 73/493 |
| 6,796,187 B2 | * | 9/2004 | Srinivasan et al. | ........... 73/784 |
| 6,993,975 B2 | | 2/2006 | Borzabadi et al. | |
| 7,038,150 B1 | * | 5/2006 | Polosky et al. | ....... 200/61.45 R |
| 7,155,975 B2 | * | 1/2007 | Mitani et al. | ............ 73/504.03 |
| 7,231,803 B2 | * | 6/2007 | Stuetzler | .................... 73/12.01 |
| 2004/0004554 A1 | | 1/2004 | Srinivasan et al. | |
| 2004/0200279 A1 | | 10/2004 | Mitani et al. | |
| 2007/0123282 A1 | * | 5/2007 | Levinson | .................... 455/500 |

FOREIGN PATENT DOCUMENTS

JP    2000 028629    1/2000

OTHER PUBLICATIONS

European Search Report dated May 9, 2007.

* cited by examiner

*Primary Examiner*—Edward Lefkowitz
*Assistant Examiner*—Freddie Kirkland, III
(74) *Attorney, Agent, or Firm*—Jimmy L. Funke

(57) ABSTRACT

A sensor module is provided having a compact housing containing a sensor. A low temperature co-fired ceramic substrate is located on the housing. The sensor and signal processing circuitry are located on the low temperature co-fired ceramic substrate. The sensor module further includes a metal shield substantially encapsulating the sensor.

11 Claims, 4 Drawing Sheets

SENSOR MODULE

TECHNICAL FIELD

The present invention generally relates to sensors and, more particularly, relates to packaged sensor modules, such as crash sensor modules for use on vehicles.

BACKGROUND OF THE INVENTION

Electronic crash sensors are commonly employed on vehicles to sense vehicle dynamics. In particular, satellite crash sensors are used for vehicle crash detection systems to sense frontal and side impact during a vehicle crash (collision). To effectively detect vehicle crashes, many vehicle crash detection systems require satellite crash sensors mounted in crush zones of the vehicle. The signal outputs of satellite crash sensors located in select crash zones typically offer optimal signal-to-noise ratio.

Many vehicle crash detection systems require several satellite crash sensors at selected locations to ensure accurate detection of a vehicle crash. For example, air bag deployment systems typically employ a multitude of sensors for sensing longitudinal and/or lateral acceleration (or deceleration). Currently, vehicles are typically equipped with pressure sensors and acceleration sensors (accelerometers). Pressure sensors are generally located in the vehicle door crush zone. Accelerometers are commonly located in a rigid beam, such as the vehicle A-pillar.

In conventional packaged sensor modules, pressure sensors and/or accelerometers are typically packaged individually. One example of a conventional satellite crash sensor module employed on a vehicle is illustrated in FIG. 1. The conventional sensor module 100 shown includes a plastic overmolded housing 112 and a printed circuit board 140 made from an alumina hybrid substrate. The circuit board substrate 140 is generally located in a recessed chamber 114 in housing 112, which is typically covered. The housing 112 is bolted to a vehicle via bolts extending through two mounting holes 116 and 117, and the connector end 118 is plugged into an electrical interface connector. The sensor 124 and related sensor signal processing electronics 144 are generally located on the alumina hybrid substrate 140 or FR4 printed circuit board.

The placement of the sensor on an alumina-based substrate allows for a cost affordable sensor module, however, a number of drawbacks exist. The alumina-based substrate is relatively large as compared to the circuitry used in a typical satellite crash sensor. Additionally, there is generally little flexibility and insufficient room to add a second sensing technology within a common housing. Also, the electromagnetic interference (EMI) requirements of an alumina-based sensor are generally difficult to meet due to the large area and lack of adequate shielding. The housing generally must be sufficiently rigid to ensure that the crash signals are accurately transmitted to the sensor on the substrate. Further, the large area of the alumina-based substrate generally requires multiple mounting bolts to ensure a high resonant frequency to avoid distortion of input signals generated during a crash.

It is therefore desirable to provide for a compact and cost affordable sensor module. In particular, it is desirable to provide for a sensor module that may be conveniently employed as a crash sensor on a vehicle. It is further desirable to provide for such a crash sensor that is relatively immune to electromagnetic interference and can be easily mounted onto the vehicle.

SUMMARY OF THE INVENTION

In accordance with the teachings of the present invention, a compact and cost affordable sensor module is provided. The sensor module includes a housing and a low temperature co-fired ceramic substrate located on the housing. A sensor is located on the low temperature co-fired ceramic substrate. Additionally, signal processing circuitry is located on the low temperature co-fired ceramic substrate. The sensor module further includes a metal shield substantially encapsulating the sensor.

The sensor module is cost affordable, compact and generally immune to electromagnetic interference. According to one aspect of the present invention, the sensor module may be employed as a crash sensor module for use on a vehicle to sense pressure and/or acceleration, according to various embodiments.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
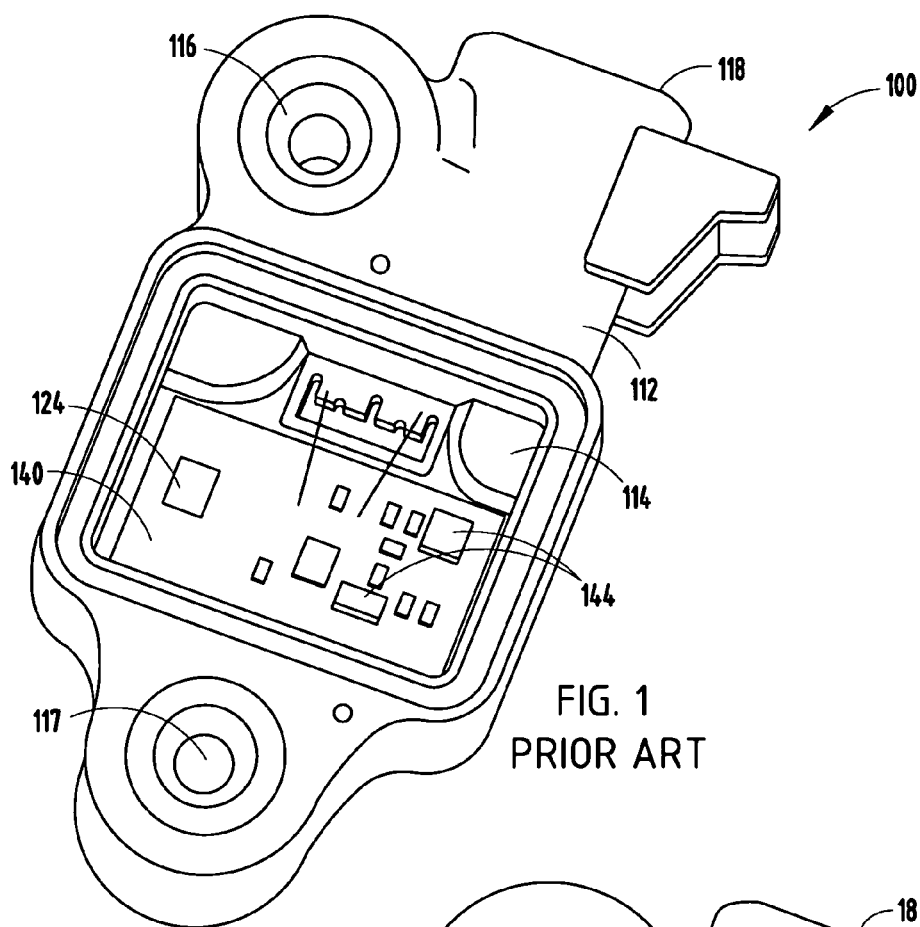
FIG. 1 is a perspective view of a conventional satellite crash sensor module.
Figure 2:
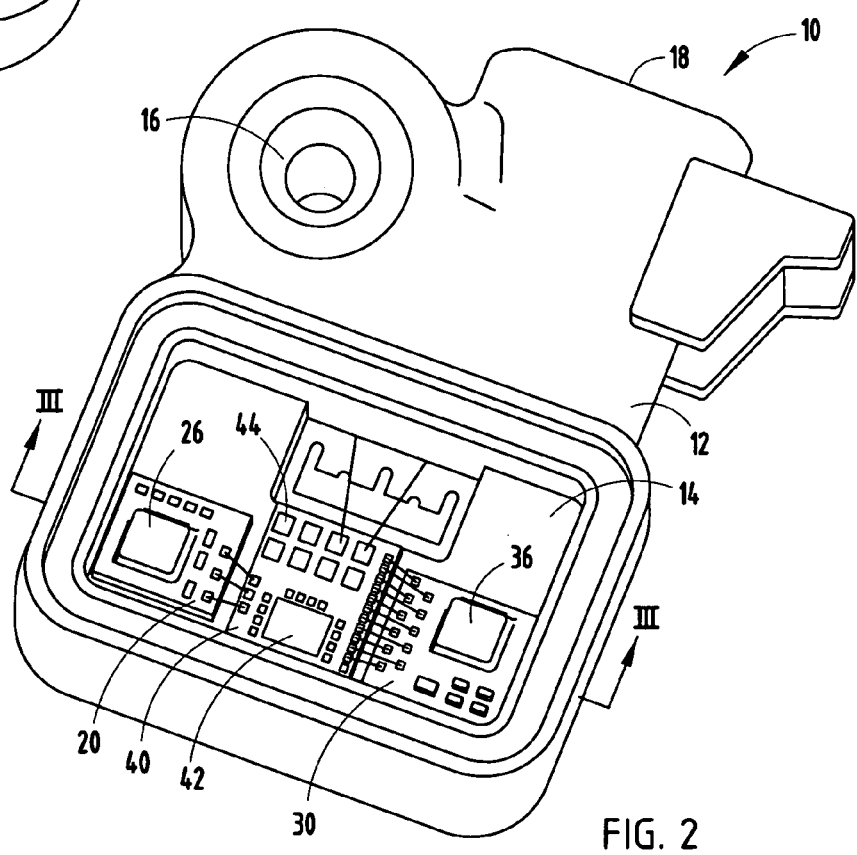
FIG. 2 is a top perspective view of a crash sensor module with the cover removed, according to one embodiment of the present invention.
Figure 3:
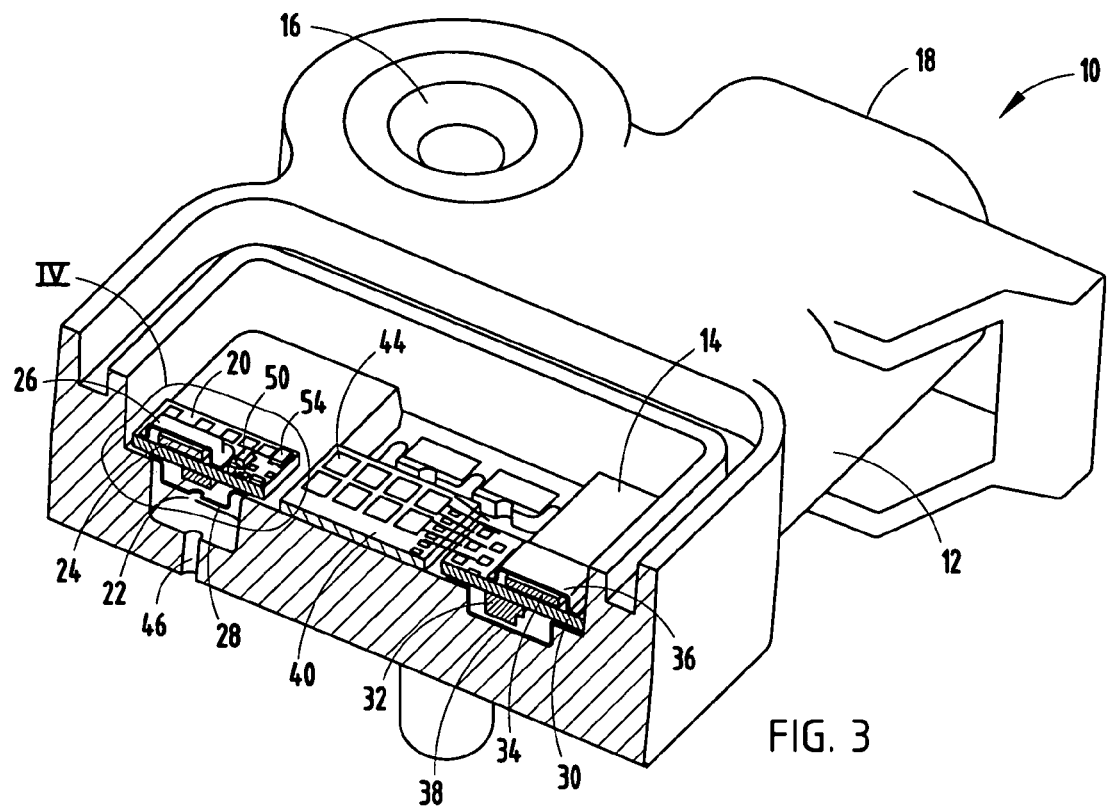
FIG. 3 is a perspective cross-sectional view of the sensor module in FIG. 2 taken through lines III-III.
Figure 4:
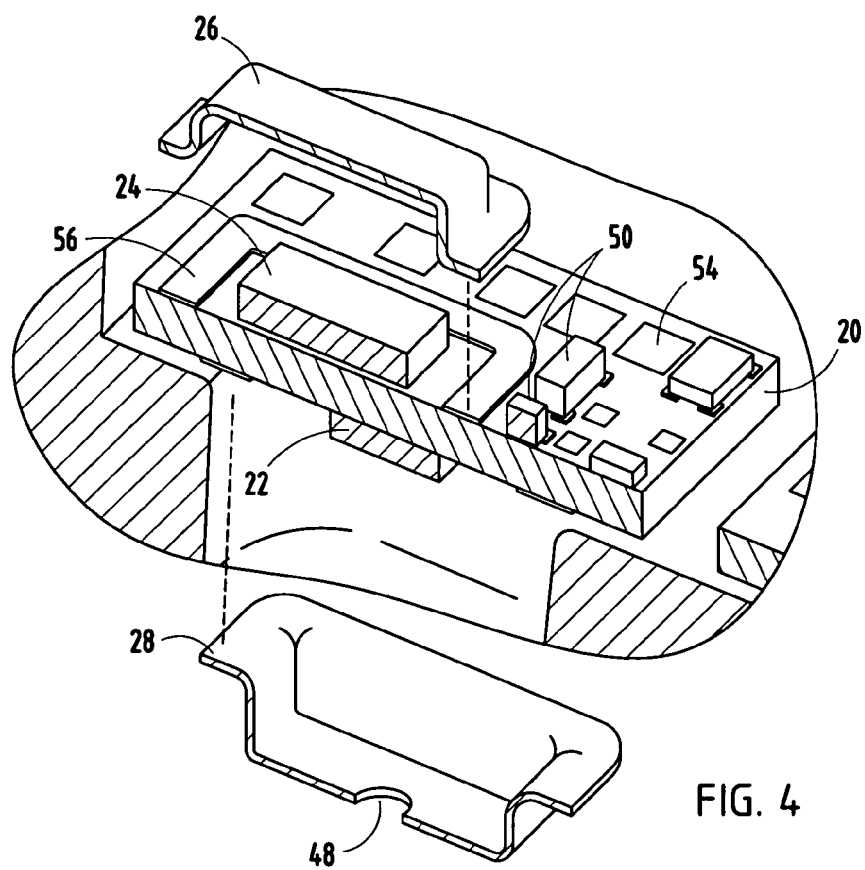
FIG. 4 is an enlarged exploded view of section IV of FIG. 3.
Figure 5:
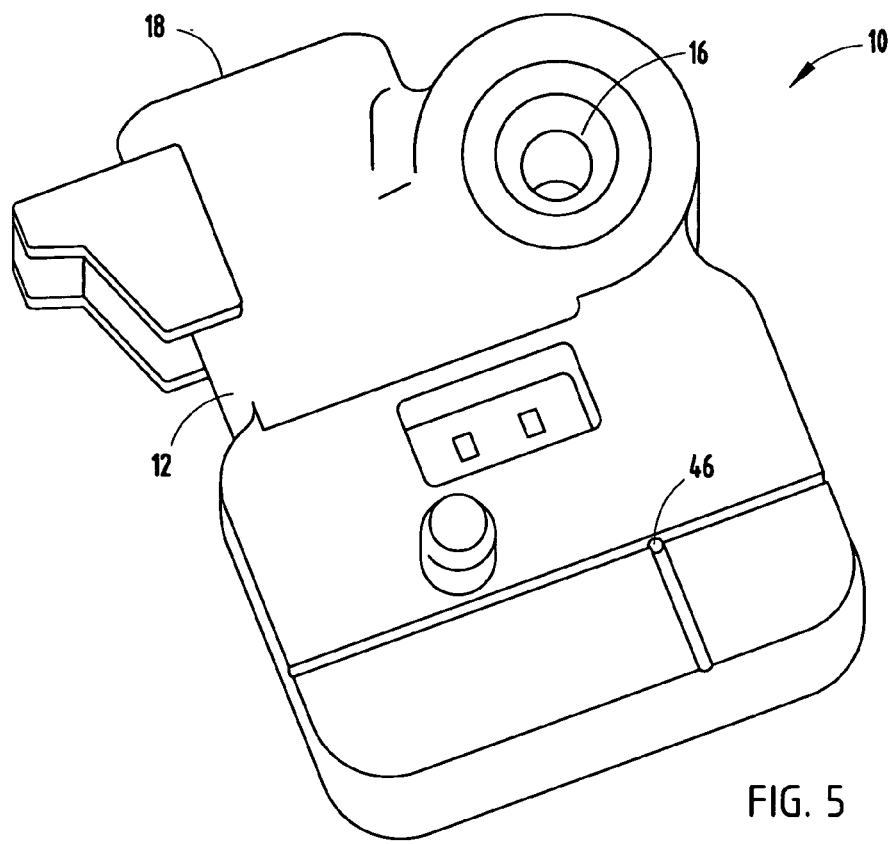
FIG. 5 is a bottom perspective view of the sensor module shown in FIG. 2.

Referring now to FIGS. 1-5, a satellite crash sensor module 10 is generally illustrated according to one embodiment of the present invention. In the first embodiment shown, the sensor module 10 contains two sensors in a packaged module capable of sensing pressure and acceleration. However, it should be appreciated that the sensing module 10 may contain other sensing devices. For example, the sensor module 10 may contain one or more sensors for sensing pressure, acceleration, velocity and other conditions alone or in combination, according to other embodiments. While the sensor module 10 is described herein as a satellite crash sensor module, it should be appreciated that the sensor module 10 may be employed in various applications on and off a vehicle.

The sensor module 10 includes a housing 12 generally having a recessed cavity 14 for receiving the sensors and related circuitry. The housing 12 may be made of plastic or metal. A metal grommet is formed extending through housing 12 generally defining a single mounting hole 16 for receiving a bolt to fasten the module 10 onto a rigid structure, such as an A-pillar or a door of a vehicle. The housing 12 further includes an electrical connecting end 18 for matingly receiving an electrical interface connector to allow for signal communications, as should be evident to those skilled in the art.

The cavity 14 of housing 12 houses one, two or more sensors and various signal processing circuitry as described herein. It should be appreciated that the cavity 14 may be closed via a top cover (not shown) to encapsulate the sensor(s) and processing circuitry within housing 12. The top cover may include a plastic lid adhered or fastened to housing 12, or a conformal coat barrier which keeps out moisture.

In the first embodiment shown, the sensor module 10 contains a pair of sensors 22 and 32 mounted onto respective first and second low temperature co-fired ceramic substrates 20 and 30. The first sensor 22 may include a pressure sensing element, such as a microelectromechanical system (MEMS) pressure sensor, located on the bottom side of the first low temperature co-fired ceramic (LTCC) 20. Mounted on the opposite top side of the first LTCC 20 is signal processing circuitry 24. The signal processing circuitry 24 may include application specific integrated circuitry (ASIC) for providing signal compensation and other processing of the sensor signals. Also mounted on the top surface of the first LTCC 20 are various signal compact pads 54 and a plurality of circuit components 50 which may include resistors, capacitors and other circuit components.

The first and second LTCC 20 and second LTCC 30 are made from multiple thin layers of ceramic. The multiple thin layers of ceramic are co-fired at a low temperature (e.g., 850° C.) to form the LTCCs 20 and 30. For example, low temperature co-fired ceramics are commercially available from E.I. du Pont de Nemours and Company, referred to as Green Tape™ LTCC materials, which are made using multilayer strip lines or a combination of strip lines and microstrip structures. The LTCC materials offer dimensional stability, low dielectric loss and good performance.

Figure 6:
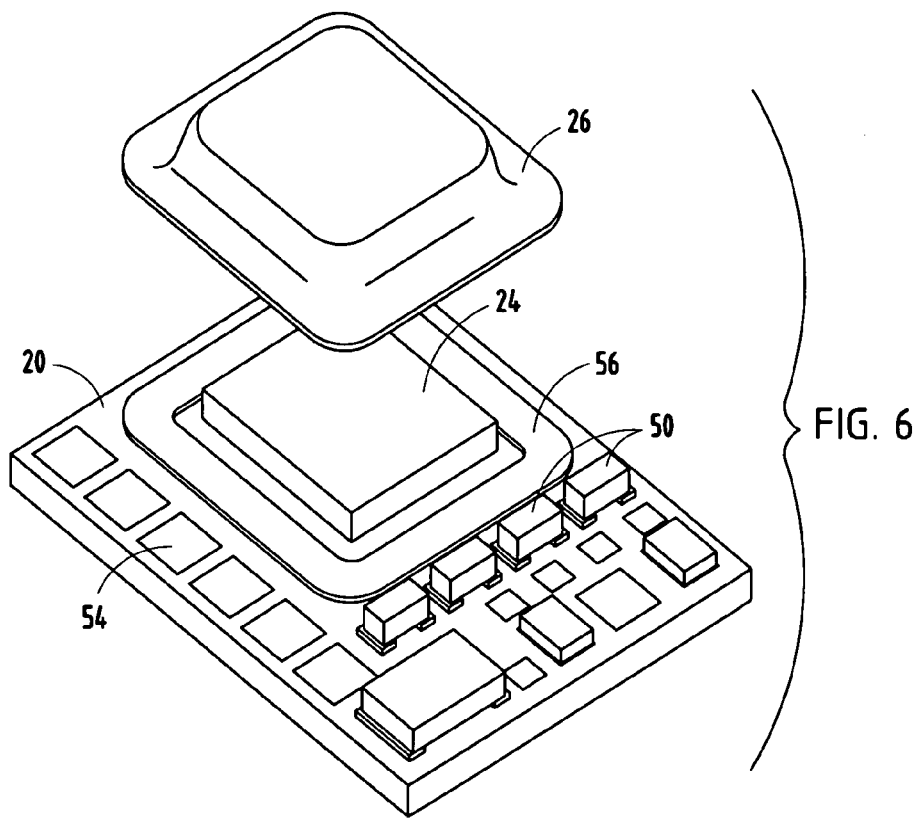
FIG. 6 is an exploded view of the top of the pressure sensing portion of the sensor module.
Figure 7:
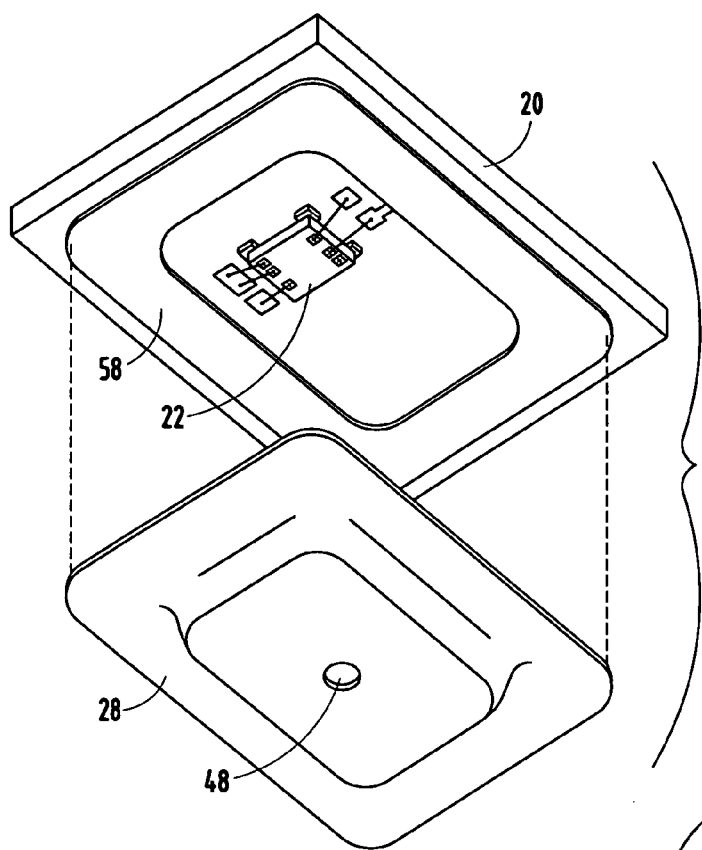
FIG. 7 is an exploded view of the bottom of the pressure sensing portion of the pressure sensor.

With particular reference to FIGS. 6 and 7, the pressure sensor 22 and processing circuitry 24 are shown substantially encapsulated by a metal shield formed of an upper metal can 26 and a lower metal can 28. The upper metal can 26 is connected to the top surface of the first LTCC 20 via a solder ring 56. The top metal can 26 thereby substantially covers the processing circuitry 24. Similarly, the bottom metal can 28 is connected to the bottom side of the first LTCC 20 via a solder ring 58 to substantially encapsulate the pressure sensor 22. While metal cans 26 and 28 are shown soldered to the LTCC via solder rings 56 and 58, respectively, it should be appreciated that the metal cans 26 and 28 may be adhered or otherwise connected to the LTCC 20.

The upper and lower metal cans 26 and 28, respectively, thereby substantially encapsulate the sensor 22 and processing circuitry 24 to provide electrical shielding to minimize the effects of electromagnetic interference (EMI). Additionally, the metal cans 26 and 28 further enhance the rigidity of the LTCC 20 and provide enhanced accuracy signals for the sensor 22. It should be appreciated that the overall surface area of the LTCC 20 is substantially smaller than the surface area of substrates employed on conventional sensor modules, such as FR4, which allows for use of a much smaller housing and an overall reduced size sensor module 10.

The bottom metal can 28 covering pressure sensor 22 has a vent hole 48 formed therein. Additionally, the housing 12 has a vent hole 46, substantially lined up with vent hole 48 that leads to the ambient environment. The vent holes 46 and 48 allow input pressure waves to get to the pressure sensor 22, without requiring a cover closure. This reduces cost and minimizes time delay in the generated crash signals.

The second sensor 32, referred to in the first embodiment as an accelerometer, is mounted onto the second LTCC 30 and is substantially encapsulated by a bottom metal can 38. The accelerometer sensor 32 may include a microelectromechanical system (MEMS) accelerometer for sensing linear or angular acceleration, according to one embodiment. Additionally, processing circuitry 34, such as in the form of an ASIC according to one embodiment, is mounted on the top surface of the second LTCC 30. Similarly, a top metal can 36 substantially covers the processing circuitry 34. The top metal can 36 and bottom metal can 38 thereby substantially encapsulate the accelerometer sensor 32 and processing circuitry 34, in a manner similar to that described in connection with the first sensor 22.

Figure 8:
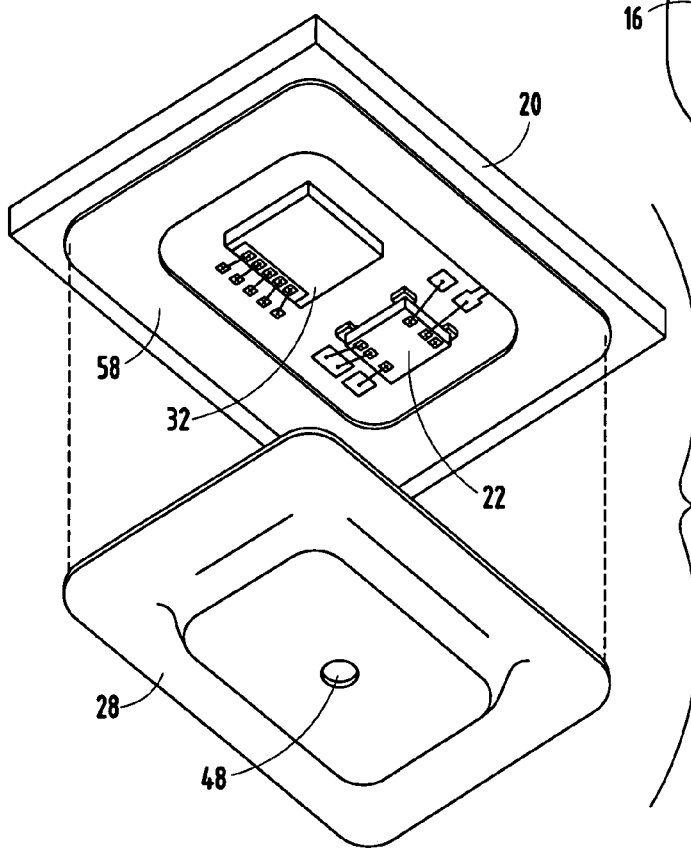
FIG. 8 is an exploded view of the bottom of a combination pressure and acceleration sensing portion of a sensor module according to another embodiment.

According to another embodiment, multiple sensors, such as the pressure sensor 22 and accelerometer 32, can be located on a single LTCC 20 as shown in FIG. 8. In this embodiment, both pressure sensor 22 and accelerometer 32 are substantially encapsulated together on the bottom side by metal can 28. The signal processing circuitry may then be located on the opposite side of the LTCC 20 and substantially encapsulated by an upper metal can.

Figure 9:
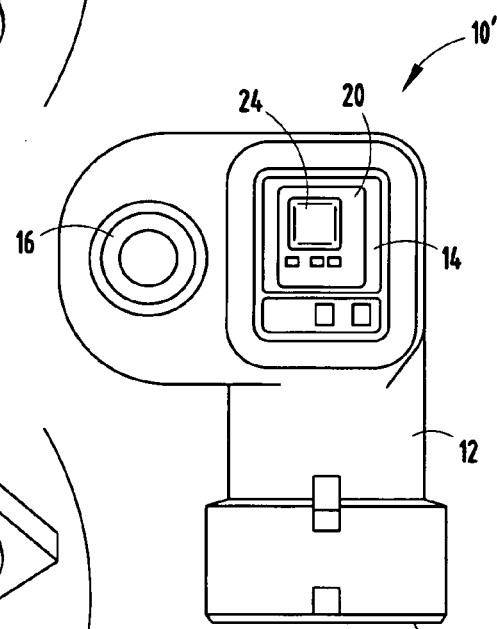
FIG. 9 is a top view of a sensor module employing a single sensor, according to a further embodiment.

Referring to FIG. 9, an alternative sensor module 10' is further illustrated according to a further embodiment of the present invention. The alternative sensor module 10' is shown containing a single sensor, such as pressure sensor 22, located on a single LTCC 20. The LTCC 20 and pressure sensor 20 are mounted on the LTCC 20 and are substantially encapsulated by a top metal can 24 and bottom metal can as described above in connection with the other embodiments.

According to other embodiments, the sensing module 10' may contain other sensing elements, such as an accelerometer. It should further be appreciated that more than two sensing elements may be employed on the sensor module 10 or 10', without departing from the teachings of the present invention.

The sensor module 10 or 10' advantageously is compact and requires less volume. Additionally, by utilizing a smaller housing, only a single bolt is required to fasten the sensor module 10 or 10' to a rigid structure while still maintaining a sufficiently high resonant frequency to ensure that generated crash signals are not distorted. The resultant flexible packaging approach achieved with the sensor module 10 or 10' allows for the accommodation of one or more pressure sensors, accelerometers, other sensors, or any combination, which is particularly useful for use as crash satellite sensors employed onboard a vehicle. Further, the sensor module 10 or 10' is reliable and minimizes the adverse effects of electromagnetic interference.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A sensor module comprising:
   a housing;
   a low temperature co-fired ceramic substrate located on the housing;

a first sensor located on the low temperature co-fired ceramic substrate, wherein the first sensor comprises a pressure sensor;

a second sensor located on a low temperature co-fired ceramic substrate, wherein the second sensor comprises an accelerometer;

signal processing circuitry located on the low temperature co-fired ceramic substrate; and a metal shield substantially encapsulating at least one of the first and second sensors.

2. The sensor module as defined in claim 1, wherein the metal shield comprises a first metal can overlying at least one of the first and second sensors on one side of the low temperature co-fired ceramic substrate, and a second metal can located on a second opposite side of the low temperature co-fired ceramic substrate.

3. The sensor module as defined in claim 2, wherein the signal processing circuitry is located on the second side of the low temperature co-fired ceramic substrate and is at least partially encapsulated by the second metal can.

4. The sensor module as defined in claim 1, wherein the signal processing circuitry comprises an ASIC.

5. The sensor module as defined in claim 1, wherein the first sensor is formed on a first low temperature co-fired ceramic substrate arid has the first metal shield, and the second sensor is located on a second low temperature co-fired ceramic substrate and has a second metal shield.

6. The sensor module as defined in claim 1, wherein the sensor is a vehicle crash sensor.

7. A vehicle crash sensor comprising:

a housing;

a low temperature co-fired ceramic substrate located on the housing;

a first sensor located on the low temperature co-fired ceramic substrate, wherein the first sensor comprises a pressure sensor;

a second sensor located on a low temperature co-fired ceramic substrate, said second sensor comprising an accelerometer;

signal processing circuitry located on the low temperature co-fired ceramic substrate; and a metal shield on the low temperature co-fired ceramic substrate and substantially encapsulating at least one of the first and second sensors.

8. The sensor module as defined in claim 7, wherein the metal shield comprises a first metal can overlying at least one of the first and second sensors on one side of the low temperature co-fired ceramic substrate, and a second metal can located on a second opposite side of the low temperature co-fired ceramic substrate.

9. The sensor module as defined in claim 8, wherein the signal processing circuitry is located on the second side of the low temperature co-fired ceramic substrate and is at least partially encapsulated by the second metal can.

10. The sensor module as defined in claim 7, wherein the signal processing circuitry comprises an ASIC.

11. The sensor module as defined in claim 7, wherein the first sensor is formed on a first low temperature co-fired ceramic substrate and has the first metal shield, and the second sensor is located on a second low temperature co-fired ceramic substrate and has second metal shield.

* * * * *